US005340140A

United States Patent [19]

Bynum

[11] Patent Number: 5,340,140

[45] Date of Patent: Aug. 23, 1994

[54] FOLDABLE OXYGEN TANK PLATFORM FOR A WHEELCHAIR

[76] Inventor: Johnnie J. Bynum, 7314 Bridges, Fort Worth, Tex. 76118

[21] Appl. No.: 94,606

[22] Filed: Jul. 19, 1993

[51] Int. Cl.[5] .......... B60R 9/00; A47C 7/62

[52] U.S. Cl. .......... 280/304.1; 297/188; 224/275

[58] Field of Search .......... 280/304.1, 250.1; 297/188, DIG. 4, 191; 224/275, 42.44

[56] References Cited

U.S. PATENT DOCUMENTS

| | | | |
|---|---|---|---|
| 3,054,638 | 9/1962 | Johnson et al. | 224/42.44 X |
| 4,045,044 | 8/1977 | Bierer | 297/188 X |
| 4,213,648 | 7/1980 | Steichen | 297/188 |
| 4,431,206 | 2/1984 | Pryor | 280/304.1 |
| 4,506,903 | 3/1985 | Bowermaster | 280/304.1 |
| 4,577,903 | 3/1986 | Wells | 297/188 |
| 4,696,420 | 9/1987 | Kulik | 280/304.1 X |
| 4,861,059 | 8/1989 | Shirk | 280/304.1 |
| 4,919,443 | 4/1990 | Kehler | 280/304.1 |

*Primary Examiner*—Karin L. Tyson
*Assistant Examiner*—Carla Mattix
*Attorney, Agent, or Firm*—Arthur F. Zobal

[57] ABSTRACT

A platform for supporting an oxygen tank and its carrier on a conventional folding wheelchair is disclosed. The platform is attached to the wheelchair and pivots between an operative position and a storage position. The platform is located in the operative position when the wheelchair is unfolded for use, and is capable of supporting the oxygen tank and its carrier in the operative position. The platform is located in the storage position when the wheelchair is folded for storage or transport.

6 Claims, 7 Drawing Sheets

Prior Art

FOLDABLE OXYGEN TANK PLATFORM FOR A WHEELCHAIR

BACKGROUND OF THE INVENTION

1.Field of the Invention

An apparatus for supporting an oxygen tank and its carrier on a wheelchair.

1. Description of the Prior Art

Wheelchair users, particularly those with respiratory ailments, often require the use of oxygen to facilitate respiration. Oxygen is available as a compressed gas contained within a cylindrical metal tank. A wheeled oxygen tank carrier to which an oxygen tank is strapped enhances the mobility of the oxygen tank, allowing the user of the tank to wheel the tank about. Wheelchair users, however, have difficulty in maneuvering the oxygen tank and its carrier about while operating the wheelchair at the same time since both of the users hands are required to operate the wheelchair. Similarly, anyone pushing a wheelchair while simultaneously wheeling the oxygen tank carrier may find that maneuvering both the wheelchair and tank carrier at the same time can be difficult.

Conventional foldable wheelchairs have no place to locate an oxygen tank and its carrier in order to remove the burden, of operating both the wheelchair and the tank carrier, from the wheelchair operator. conventional foldable wheelchairs are designed to transport a wheelchair occupant and to fold up neatly for ease of storage, not to carry an oxygen tank. Location of a permanent support for the oxygen tank and its carrier on the wheelchair is made difficult by the collapsible frame of the wheelchair which allows the wheelchair to be folded for storage.

SUMMARY OF THE INVENTION

It is an object of the invention to provide a support for locating an oxygen tank and its carrier thereon, where the support is attached to a conventional foldable wheelchair.

It is a further object of the invention to provide a support for locating an oxygen tank and its carrier thereon, the support being located on a foldable wheelchair such that the support is positioned to support the oxygen tank and its carrier when the wheelchair is in an unfoldable operative position, and is positioned in a storage position when the wheelchair is folded for storage.

A platform is attached to a conventional folding wheelchair so that the platform may extend between the tipping levers of the wheelchair below and behind the seat of the wheelchair. The platform has tank carrier coupling means which allow a oxygen tank carrier to be coupled to, and supported by, the platform when the platform is extended across the tipping levers. Pivot means enable the platform to be pivoted from across the tipping levers to an upright storage position. The wheelchair may be easily folded for storage or transport when the platform is located in the storage position.

DESCRIPTION OF THE PREFERRED EMBODIMENT

Figure 1:
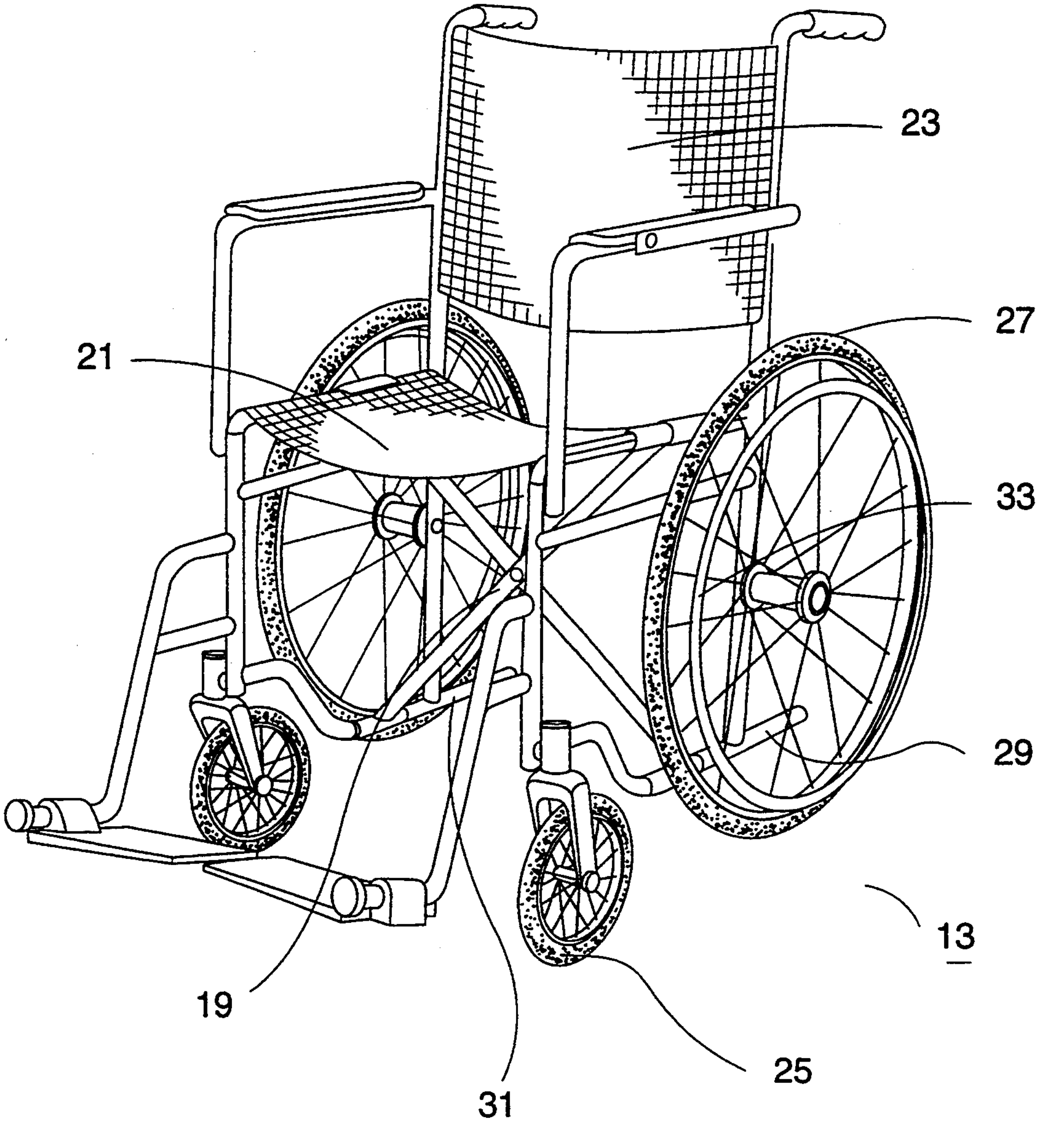
FIG. 1 is a view of a conventional foldable wheelchair.
Figure 4:
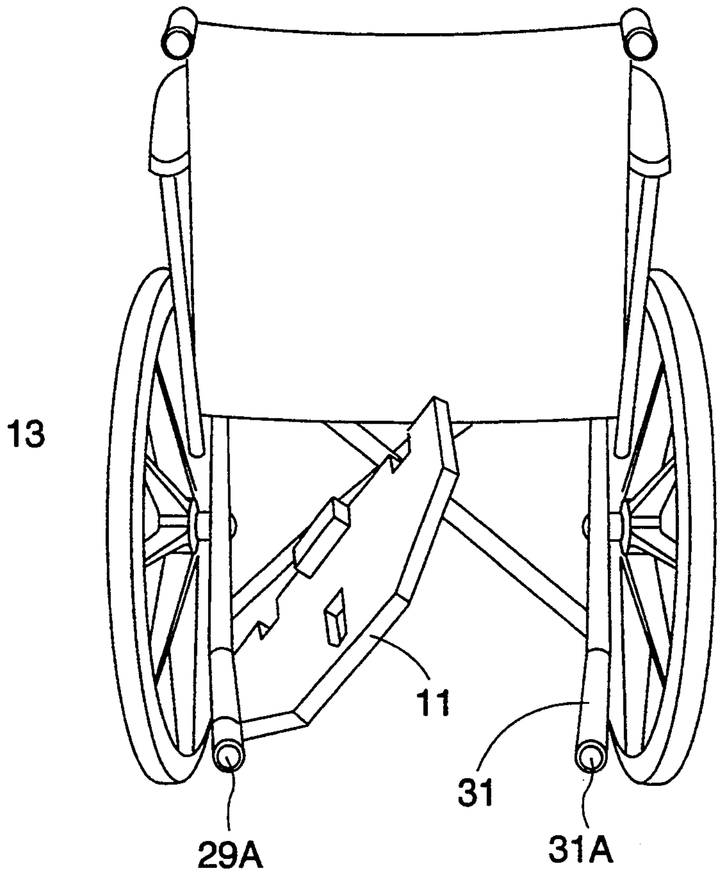
FIG. 4 is a view of the platform of FIG. 3, with the oxygen tank and carrier removed, attached to the wheelchair and being moved to a storage position.
Figure 2:
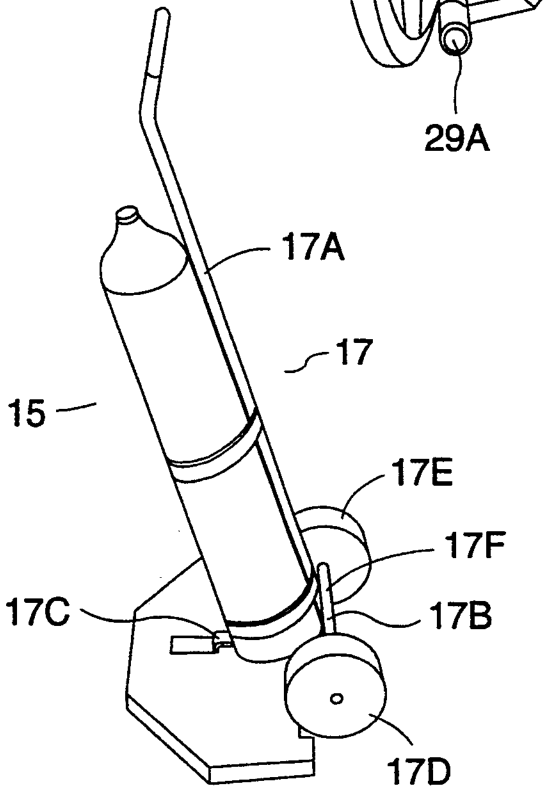
FIG. 2 is a view of a conventional oxygen tank on a wheeled support.
Figure 3:
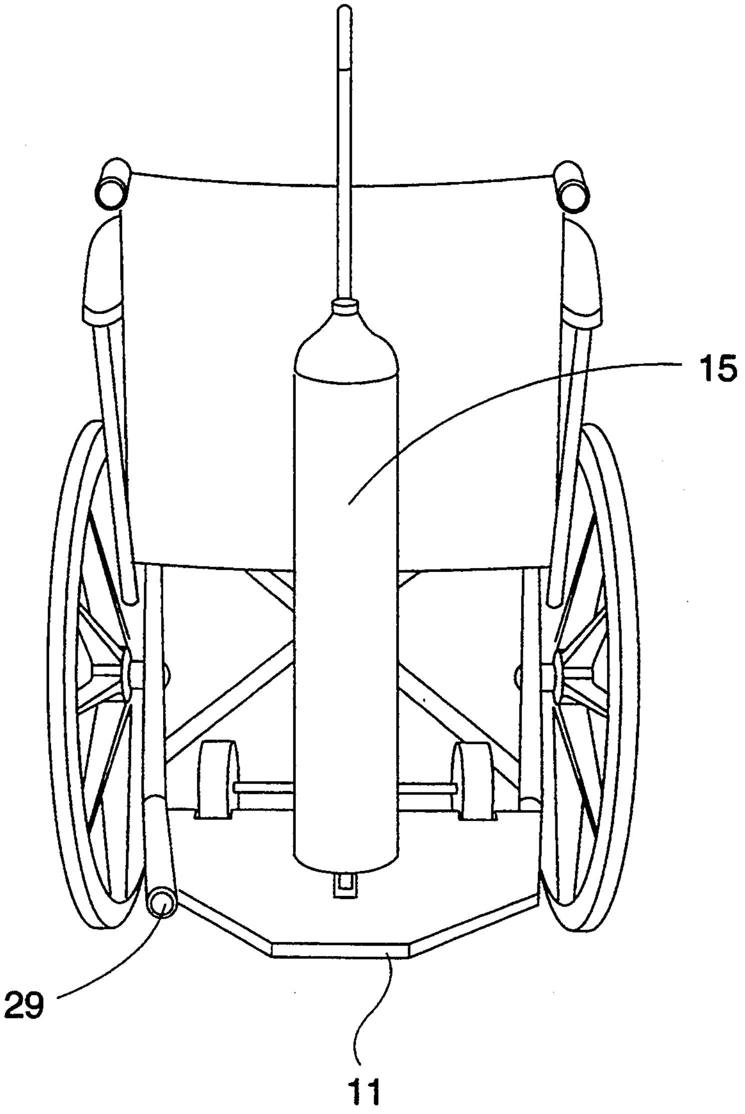
FIG. 3 is an isometric view of one embodiment of the platform of the invention attached to a foldable wheelchair having an oxygen tank and its carrier located thereon.
Figure 5:
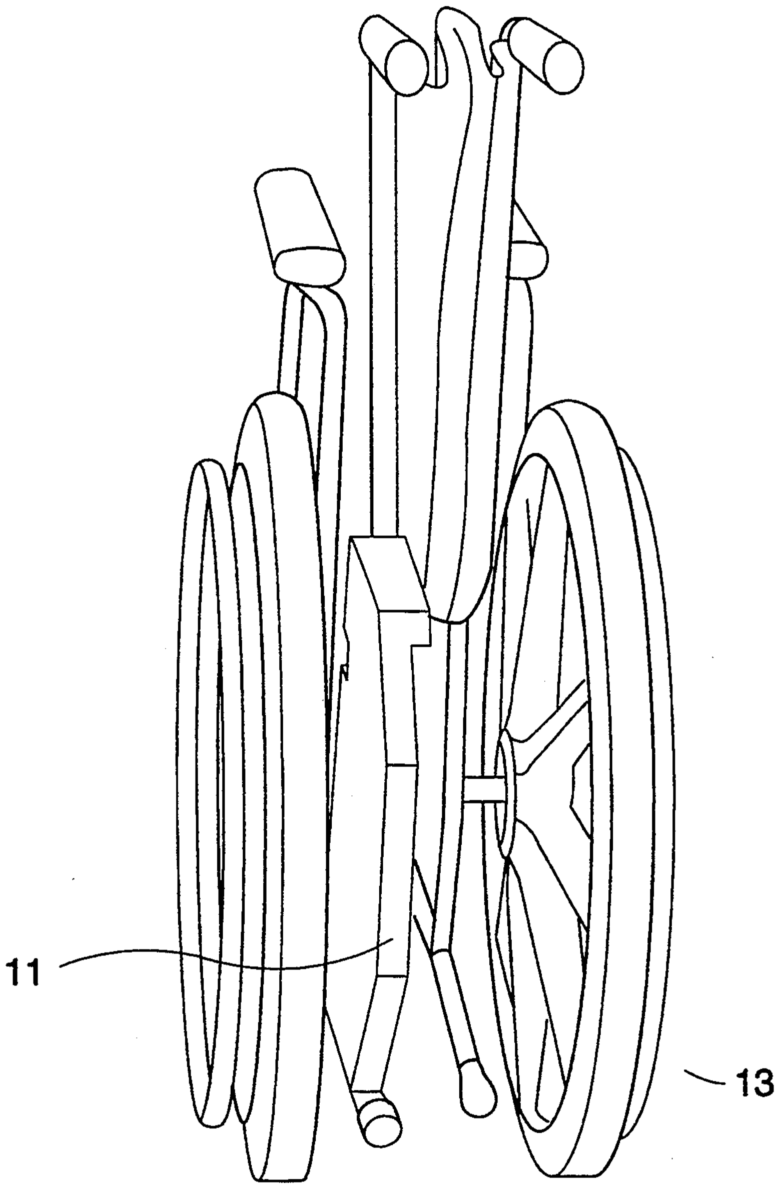
FIG. 5 is a view of the wheelchair in a foldable position with the platform of FIG. 3 located between the rear wheels.

As shown in FIGS. 3, 4, and 5, the invention comprises a platform 11 attached to a foldable wheelchair 13 for carrying an oxygen tank 15 and an oxygen tank carrier 17. The upper components of the tank 15 are not shown for purposes of clarity. The platform 11 enables a wheelchair user to easily carry a tank of oxygen 15 on the wheelchair 13 instead of having to drag the oxygen tank 15 and its carrier 17 alongside the wheelchair 13. The platform 11 is designed so that the wheelchair 13 may be folded for storage or transport without having to remove the platform 11. When the wheelchair 13 is unfolded for use, the attached platform 11 is easily located in a position for carrying the oxygen tank 15 and its carrier 17.

The platform 11 of the invention is formed to be fitted onto a conventional folding wheelchair 13. This wheelchair is similar to the foldable wheelchair disclosed in U.S. Pat. No. 4,648,615, which patent is incorporated herein by reference. The wheelchair 13 has a collapsible frame 19 that may be opened to an unfolded operative position or closed to a folded storage position. A flexible seat 21 and a flexible back upright 23 are coupled to the frame 19 and cooperatively form a chair when the frame 19 is located in its unfolded operative position. The seat 21 and back upright 23 fold when the frame 19 is located in its folded storage position. Front and rear wheels 25 and 27 are also coupled to the frame 19 which rides on the wheels 25 and 27 in the unfolded operative position. The wheels 25 and 27 are located in a contracted, space saving position when the frame 19 is in the folded storage position. Two cylindrical tipping levers or rods 29 and 31 are also fixedly connected to the frame 19, extending below and behind the seat 21 and back upright 23 between the rear wheels 27 to provide leverage for tipping the wheelchair 13 backwards. Removable end caps 29A and 31A are fitted around the ends of the levers 29 and 31. When the frame 19 is extended in the unfolded operative position, a space 33 extends between the tipping levers 29 and 31, the space 33 being useful for location of the platform 11 of the current invention.

The platform 11 provides a support for carrying the oxygen tank 15 and the tank carrier 17 when the wheelchair 13 is located in its unfolded operative position, yet pivots neatly to allow the wheelchair 13 to be folded to its storage position (FIGS. 4, 5). When the wheelchair 13 is unfolded, the platform 11 extends to an operative position below the seat 21 across the space 33 between the tipping levers 29 and 31 substantially parallel to the unfolded seat 21. The oxygen tank 15 and its carrier 17 extend upwards behind the back upright 23 when located on the platform 11. The tipping levers 29 and 31 of the wheelchair 13 support the platform 11 which in turn supports the oxygen tank 15 and carrier 17.

In the folded position of the wheelchair 13, the platform 11 is moved to a folded position substantially parallel to the planes of the rear wheels 27 (FIG. 3). The platform 11 is capable of pivoting from the operative position to the folded position so that the wheelchair 13 may be folded without interference from the platform 11 and the platform 11 may be conveniently located for storage on the wheelchair 13. A raised rail 35 on the platform 11 and at least one runner 37 abut the frame 19 of the wheelchair 13 when the platform is located in the folded or storage position thereby holding the platform 11 in place against the frame of the wheelchair 13. The platform 11 pivots about one (FIGS. 3–7) or both (FIG. 8) of the tipping levers 29 and 31 to move between the space 33 bridging position of the unfolded operating wheelchair 13 and the folded storage position of the folded wheelchair 13.

In the embodiment of FIGS. 3-7, the platform 11 is shaped to conveniently fit about the tipping levers 29 and 31 behind and below the seat 21 of the unfolded wheelchair 13. The platform 11 has first and second side edges 39 and 41 which adjoin the tipping levers 29 and 31 when the platform 11 is attached to the wheelchair 13. The platform 11 also has leading and trailing edges 43 and 45 which extend between the first and second edges 39 and 41, the shape of the platform 11 being defined by the first, second, leading and trailing edges so that the platform 11 may be securely supported by the tipping levers 29 and 31.

The platform 11 is designed so that an oxygen tank 15 and its carrier 17 may be easily located on and removed from the platform 11. The platform 11 has top and bottom sides 47 and 49, where the top side 47 accepts and supports the oxygen tank 15 and its carrier 17 when the wheelchair 13 is in its unfolded operative position and the platform 11 is located across the space 33 between the tipping levers 29, 31. The tank carrier 17 comprises a lower handle 17A having a lower transverse end 17B with an L-shaped leg 17C and two wheels 17D and 17E which rotate about an axle 17F the latter of which is attached to the lower handle end 17B. The oxygen tank carrier 17 is secured to the top side 47 of the platform 11 by the tank carrier coupling means of the platform 11 which is comprised of a leg accepting notch 51 and a U-shaped clamp 53 with two thread arms 53A and 53B. The leg accepting notch 51 is an opening centrally located in the platform 11 which accepts the leg 17C of the tank carrier 17 therethrough. The legs of the clamp 53 extends through two apertures 51A and 51B formed through the platform 11. In order to secure the oxygen tank 15 and its carrier 17 to the platform 11, the leg 17C of the carrier 17 is located in the leg accepting notch 51 so that the leg 17C of the carrier 17 extends towards the leading edge 43 of the platform 11. The U-shaped clamp 53 is located over the leg 17C, with its arms 53A and 53B extending through apertures 51A and 51B and wing nuts 53C and 53D are screwed to the legs 53A and 53B against the back side of the platform 11.

Wheel notches 59 are provided in the platform 11 for accepting the wheels 17D and 17E of the tank carrier 17. The wheel notches 59 are located in the leading edge 39 of the platform 11 and extend through the platform 11. The wheel notches 59 are spaced to accept the wheels of a conventional oxygen tank carrier 17 when the tank carrier 17 is located on the platform 11 with the tank carrier leg 17C located in the leg accepting notch 51 of the platform 11. The wheels of the tank carrier 17 are held, by the platform 11 about three inches above the floor.

The platform 11 is coupled to the wheelchair 13 about the tipping levers 29 and 31 of the wheelchair 13. In the embodiment of FIGS. 3–7, the means for coupling the platform 11 to the wheelchair 13 comprises a hinge member 63 connected to the side edge 39 of the platform 11. The hinge member 63 has a cylindrical opening 64 extending therethrough. Member 63 is capable of slidably receiving the tipping lever 19, when the cap 29A is removed, so that the platform 11 may employ the member 63 to pivot about the tipping lever 29 between the space bridging position when the wheelchair 13 is unfolded and the folded position of the folded wheelchair 13. The end cap 29A prevents the member 63 from sliding off the tipping lever 29.

The platform 11 is secured in a level, stable position when located across the first and second tipping levers 29 and 31 by a gripping rail 69. The gripping rail 69 is coupled to the bottom side 49 of the platform 11 and extends therefrom along the second edge 41 of the platform 11. The gripping rail 69 is seated against the second tipping lever 31 when the platform 11 extends between the tipping levers 29 and 31 so that the level platform is supported by the tipping levers 29 and 31 which in turn are supported by the frame 19 of the wheelchair 13.

Figure 8:
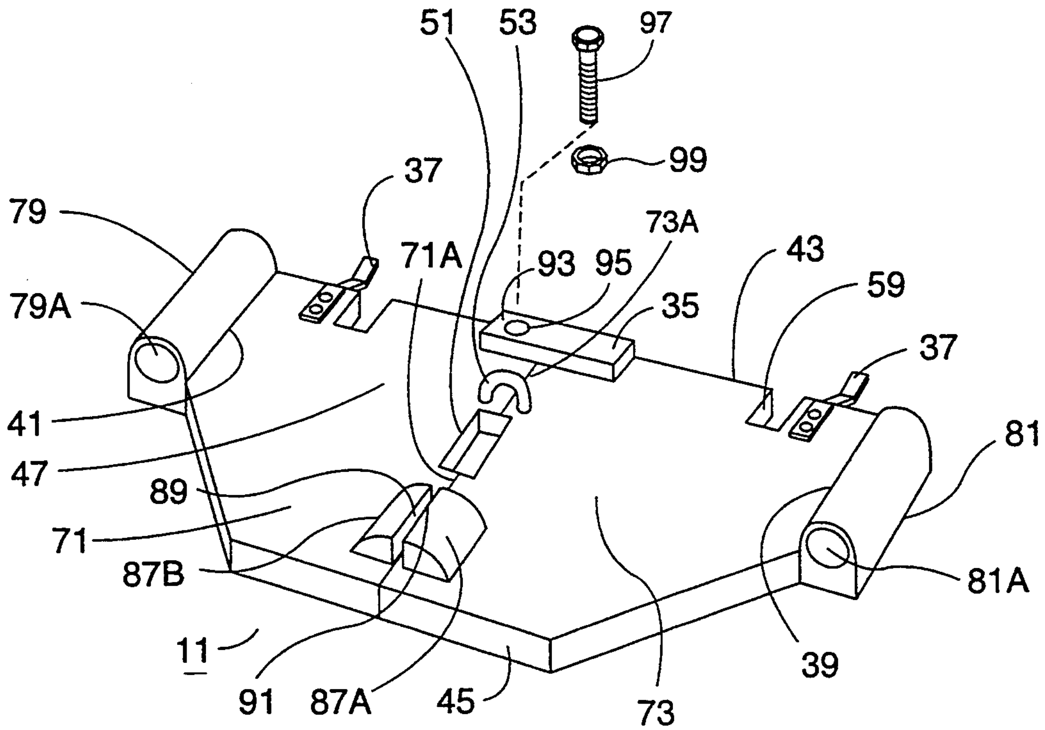
FIG. 8 is an isometric view of two platform members each having its own hinge member.

In the embodiment of FIG. 8, the platform 11 comprises two split members 71 and 73 with hinge members 79 and 81 connected to their outer edges 41 and 39. Hinge members 79 and 81 have cylindrical openings 79A and 81A extending therethrough respectively. The members 71 and 73 are separate from each other and have inner edges 71A and 73A.

The openings 79A and 81A of the hinge members 79 and 81 are capable of receiving the tipping levers 29 and 31 respectively, when the end caps 29A and 31A are removed, so that the members 71 and 73 may be pivoted about the tipping levers 29 and 31 between a bridged position across the tipping levers 29 and 31 and a transverse storage position. In the bridged position, the members 71 and 73 extend across the space 33 between the tipping levers 29 and 31 with their inner edges 71A and 73A engaging each other thereby forming a single level surface supported by the hinge members 79 and 81 coupled to the tipping levers 29 and 31. In the transverse storage position, the members 71 and 73 extend upward from the tipping levers 29 and 31 and the members 71 and 73 are located adjacent to rear wheels 27 and generally parallel to the rear wheels 27. The removable end caps 29A and 31A prevent the hinge members 79 and 81 from sliding off the tipping levers 29 and 31.

The platform members 71 and 73 of the platform 11 of this embodiment are provided with stops 87A and 87B to enable the members 71 and 73 to maintain a lever support for the oxygen tank 15 and its carrier 17 when the members 71 and 73 are located bridging the space 33 between the tipping levers 29 and 31. The stops 87A and 87B are shaped as separable curved wedges integrally coupled to the top sides 47 of the platform members 71 and 73 along the trailing edges 45 of the platform members 71 and 73. The stops 87A and 87B have inner faces 89 and 91 which abut each other when the platform members 71 and 73 bridge the space 33 between the tipping levers 29 and 31, thereby preventing the platform members 71 and 73 from pivoting downward past a level position about the tipping levers 29 and 31 when the oxygen tank 15 and its carrier 17 are located on the platform.

The raised rail 35 also may be used to maintain the platform members 71 and 73 in a level relationship between the tipping levers 29 and 31. The rail 35 is connected to the top side 47 of the platform member 73 along its leading edge 43 so that a section 93 of the rail 35 extends to the platform member 71 when the platform members 71 and 73 are located in the bridging position between the tipping levers 29 and 31. The section 73 of the rail 35 that extends over the member 71 has a bolt hole 95 extending therethrough which aligns with a similar bolt hole extending through the member 71 when the platform members 71 and 73 are located in a level, bridging position. A bolt 97 is inserted through the bolt holes of the rail 35 and the platform member 71 and a nut 99 is screwed to the nut to fasten the rail 35 and the member 71 together.

The platform 11 and the hollow hinge members 63, 79, 81 are formed of materials strong enough to enable the platform 11 to support the oxygen tank 15 and the tank carrier 17. The platform 11 of the embodiments of FIGS. 3–7 and 8 may be formed of wood, hard plastic, or metal of sufficient thickness to support the oxygen tank 15 and carrier 17 thereon. The hinges 63 and 79 and 81 may be formed of metal or hard plastic. The gripping rail 69, raised rail 35, and stops 87A and 87B are preferably formed of the same material as the platform 11 itself. The runners 37 are typically metal strips, however, the runners 37 may be formed of hard plastic as well.

Figure 6:
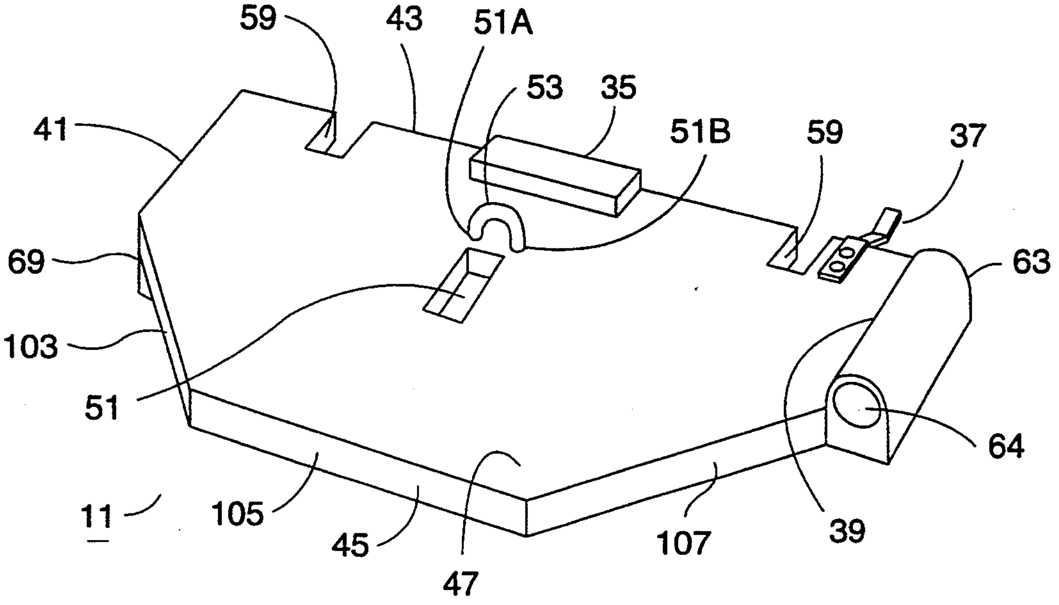
FIG. 6 is an isometric view of a single platform having a single hinge member.
Figure 7:
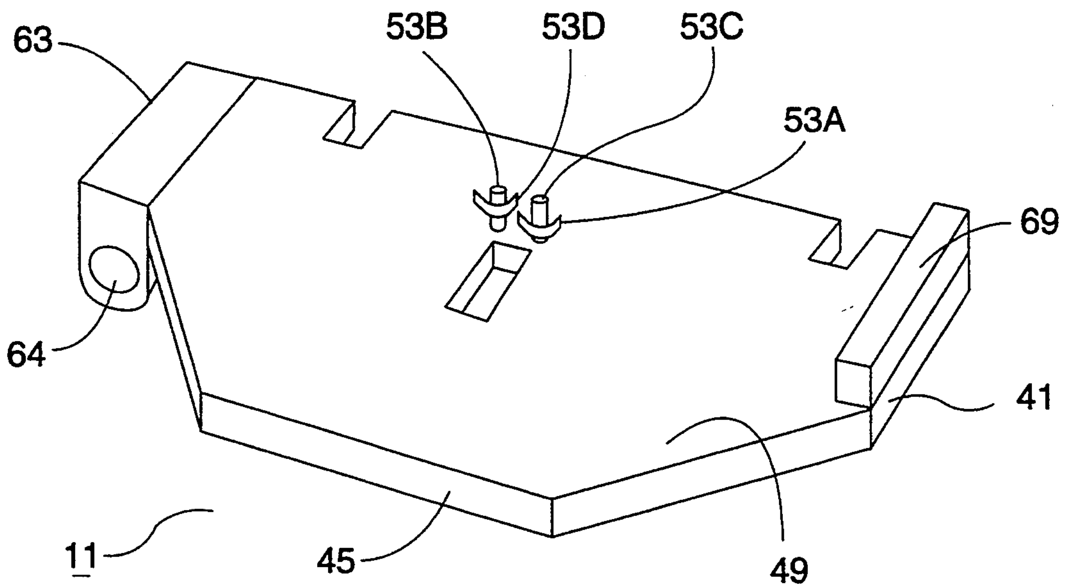
FIG. 7 is an isometric view of the bottom side of the platform of FIG. 6.

In one embodiment, as shown in FIGS. 6 and 7, the platform 11 has a hexagonal shape, the trailing edge 45 having a left, center and right portion 103, 105, 107. The platform 11 extends 16 inches from edge 39 to edge 41 and 9½ inches from the leading edge 43 to the center portion 105 of the trailing edge 45. The edges 39 and 41 are 5½ inches long, the left, center, and right position 103, 105, 107 of the trailing edge 45 are 6½ inches long, and the leading edge 43 is 16 inches long.

The leg accepting notch 51 is located 4¾ inches from the leading edge 43 and 1¾ inches from the center portion 105 of the trailing edge 45 and extends 3 inches lengthwise. The leg accepting notch 51 is located 7¼ inches from the edges 39 and 41 and is 1½ inches wide. The clamp 53 is located 4 inches from the leading edge 43. The wheel notches 59 are located 2¼ inches from the edges 39 and 41 along the leading edge and are 1¾ inches wide. The wheel notches 59 extend one inch from the leading edge 43 toward the trailing edge.

The gripping rail 69 extend along the second edge 41 of the platform 11 and is 5 inches long, ½ inch wide, and ½ inch high. The raised rail 35 extends along the leading edge 43 and is 3½ inches long, ¾ inches wide and ¾ inches high. The runner 37 is located ¾ inches from the edge 39 between the first edge 39 and a wheel notch 59. The runner 37 is ¾ inches wide.

It is to be understood that devices other than those disclosed may be employed to hold the platform members 71 and 73 in the same plane when in their bridging position for supporting the oxygen tank and its carrier.

I claim:

1. A foldable wheel chair apparatus capable of carrying a tank carrier and an oxygen tank comprising:

a collapsible frame, a seat, a back upright, at least one pair of rear wheels, at least one pair of front wheels, and two tipping levers, wherein said seat, back upright, rear wheels, front wheels, and tipping levers are coupled to said frame, and said collapsible frame may assume an unfolded operative position and a foldable storage position;

a platform capable of securing and holding a tank carrier and an oxygen tank;

in said unfolded operative position of said wheelchair said rear wheels, front wheels, tipping levers, seat, and back upright are located in position to allow said seat and said back upright to form a chair with a space located between said tipping levers, said tipping levers being located between said rear wheels below and behind said seat and extending rearward;

in said folded storage position of said wheelchair said tipping levers are located adjacent to each other, said rear wheels and said front wheels are located in contracted positions, and said seat and said back upright are located in collapsed, folded positions;

coupling means for coupling said platform to at least one of said tipping levers of said wheelchair below and behind said seat, said platform being coupled to said wheelchair bridging said space between said tipping levers when said wheelchair is in said unfolded operative position so that said platform may support a tank carrier and an oxygen tank, and, when said tank and carrier are removed from said platform, said platform being coupled to said wheelchair in a folded position when said wheelchair is in said folded storage position, said coupling means allowing said platform to be moved between bridging said space between said tipping levers and said folded position.

2. The foldable wheelchair apparatus of claim 1, wherein:

said platform has hinge means for pivotally coupling said platform to at least one of said tipping levers, allowing said platform to be moved from a folded position to a bridging position across said tipping levers;

said platform has a tank carrier coupling means for securing and retaining a tank carrier and an oxygen tank to said platform.

3. The foldable wheelchair apparatus of claim 2, wherein:

said platform comprises a single platform member having two ends, a hinge means for pivotally coupling one end of said single platform member to said one tipping lever with the other of said ends of said single platform member being movable toward and away from the other of said tipping levers and supportable by the other of said tipping levers.

4. The foldable wheelchair apparatus of claim 3, wherein:

said hinge means comprises a hinge member secured to said platform and having an opening for receiving said one tipping lever for allowing said single platform to pivot about said one tipping lever.

5. The foldable wheelchair apparatus of claim 2, wherein:

said platform comprises two platform members having two hinge means respectively for pivotally coupling said two platform members to said two tipping levers respectively for pivotal movement to said bridging position and to folded positions, and support means for supporting said two platform members in said bridging position for allowing said two platform members to support said tank carrier and said oxygen tank.

6. The foldable wheelchair apparatus of claim 5, wherein:

each of said hinge means comprises a hinge member having an opening for receiving one of said tipping levers whereby said two platform members may be pivoted about said two tipping levers respectively, said support means is capable of maintaining said two platform members in a level position when said platform members are extended between said first and second tipping levers, and when a tank carrier and an oxygen tank are located on said platform members.

* * * * *